Figure 1:
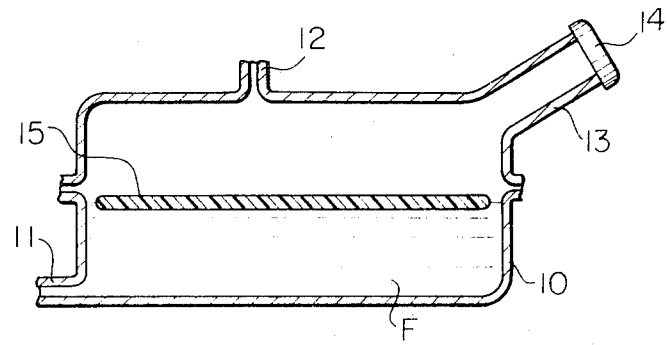

United States Patent

Shiobara et al.

[15] 3,653,537

[45] Apr. 4, 1972

[54] FUEL TANK OF AUTOMOTIVE INTERNAL COMBUSTION ENGINE

[72] Inventors: Masaji Shiobara; Yoshio Toda, both of Yokohama, Japan

[73] Assignee: Nissan Motor Company, Limited, Yokohama, Japan

[22] Filed: Feb. 6, 1970

[21] Appl. No.: 9,365

[52] U.S. Cl. ............................................. 220/85, 220/20.5
[51] Int. Cl. ........................................................ B65d 25/00
[58] Field of Search ..................... 220/85 B, 93, 26, 20, 20.5, 220/85 VS, 85 VR, 85 V; 137/572, 578, 587, 454

[56] References Cited

UNITED STATES PATENTS 2,907,627   10/1959   Cummings ............................... 220/26

3,419,174   12/1968   Engdahl ................................ 220/26 X

FOREIGN PATENTS OR APPLICATIONS 1,109,506   9/1955   France ................................. 220/85 B Primary Examiner—Raphael H. Schwartz
Attorney—John Lezdey

[57] ABSTRACT

A fuel tank for an automotive internal combustion engine, adapted to prevent the liquid fuel from being vapourized and discharged from the breathing vent in the tank wall, which tank has a float having the coverage that is substantially coextensive with the surface of the liquid fuel that is otherwise to be exposed to the atmosphere through the breathing vent.

4 Claims, 2 Drawing Figures

PATENTED APR 4 1972 3,653,537

MASAJI SHIOBARA & YOSHIO TODA INVENTORS

BY John Legley
ATTORNEY

FUEL TANK OF AUTOMOTIVE INTERNAL COMBUSTION ENGINE

This invention relates to a fuel tank of a gasoline-powered internal combustion engine and, more particularly, to an improved fuel tank of the character in which the liquid fuel stored therein is prevented from being vapourized and discharged as air-pollutants to the open air.

All fuel tanks of internal combustion engine are vented to the atmosphere to allow the evaporative hydrocarbons to escape into the atmosphere and the evaporative losses from the fuel tanks account much for the vehicular air-pollution problems. To reduce such evaporative losses from the fuel tanks, it is proposed in the limited sectors of the industry to construct the fuel tank in such a manner that the breathing vent is closed when the pressure of evaporated fuel in the tank is lower than a certain limit. The fuel tank constructed on such scheme, however, tends to invite an overflow of the fuel into the carburettor because, if the pressure in the tank happens to critically increase due to a rise in the ambient temperature or the very pressure of the evaporated fuel, then an excessively high pressure is exercised on the needle valve in the outlet to the carburettor venturi.

It is therefore an object of the invention to provide an improved fuel tank for a gasoline-powered internal combustion engine, which fuel tank contributes to the prevention of air-pollution problem resulting from the admission of evaporated fuel to the open air.

It is another object of the invention to provide a fuel tank adapted to prevent the fuel in the tank from being vapourized and discharged to the open air.

It is still another object of the invention to provide a fuel tank whereby evaporative losses resulting from admission of liquid fuel to the open air can be minimized without inviting an overflow of the fuel into the carburettor venturi.

Although the fuel tank according to the invention is specifically intended to solve the air-pollution problem traceable to the evaporative hydrocarbons, the same will prove beneficial not only for fuel economy purposes but for the reduction of noises otherwise produced in the fuel tank by the rippling of the liquid fuel.

In order to achieve the above-said objects, the invention proposes to provide a fuel tank having a float of a coverage substantially coextensive with the surface of the fuel to be otherwise exposed to the atmosphere through a breathing vent. The float may be mounted either in the fuel tank of conventional construction with breathing vent formed in its wall or in a separate compartment communicating at its bottom with the existing fuel tank. Where such separate compartment is to be attached to the existing float bowl, the breathing vent may be formed in the wall of the separate compartment.

Figure 2:
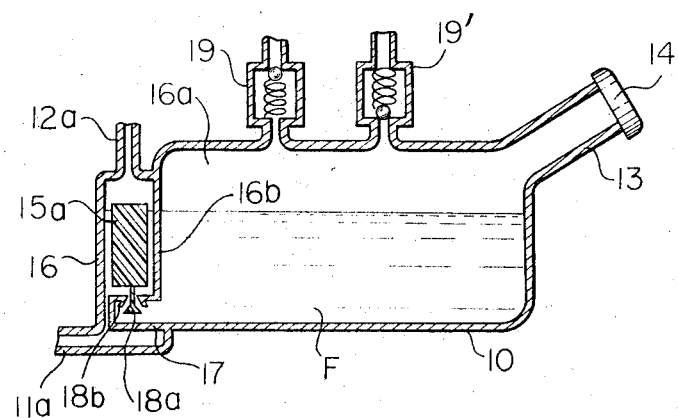

In the drawing:

FIG. 1 is a sectional view showing schematically the fuel tank with a float according to the invention; and FIG. 2 is similar to FIG. 1 but shows a modification of the fuel tank of FIG. 1.

In FIG. 1, the fuel tank is represented generally by numeral 10. The fuel tank 10 stores liquid fuel "F" therein and communicates through a fuel line 11 with the carburettor venturi (not shown), as customary. The fuel tank 10 is vented to the atmosphere through a breathing vent 12. Designated by 13 and 14 are a filler pipe and a cap therefor, respectively.

According to the invention, a float 15 is mounted in the fuel tank 10, floating over the surface of the fuel to be otherwise exposed to the atmosphere through the breathing vent 12. The float 15, as shown, has a surface area that is substantially coextensive with the surface of the fuel. The float 15 may be made of plastics, synthetic rubber (foaming rubber) or any other similar material having a specific weight smaller than that of the liquid fuel.

The float 15 thus floating over the surface of the liquid fuel "F," the liquid fuel is substantially isolated from the atmosphere and only a limited quantity of the liquid fuel is allowed to evaporate in the fuel tank.

A modified form of the fuel tank according to the invention is illustrated in FIG. 2.

In FIG. 2, a compartment 16 which is partially separated from the remaining compartment is formed in the tank 10. The compartment 16 is separated partially from the remaining compartment 16a by means of a partition 16b extending from the top wall of the tank 10 and terminating halfway from the bottom wall of the tank. The partially separate compartment 16 communicates on one side with the remaining compartment 16a of the tank through a passage 17 and on the other with the fuel line 11a.

A float 15a is mounted in this compartment 16 to cover the substantially total area of the surface of the fuel in the compartment 16. The compartment 16 is vented to the atmosphere through a breathing vent 12a. The surface of the fuel to be otherwise exposed to the atmosphere through the vent 12a is thus isolated therefrom by the float 15a.

A valve means is preferably provided intermediate between the fuel tank 10 and separate compartment 16. The valve means comprises a valve head 18a depending from the bottom of the float 15a and a valve seat 18b forming part of the passage 17. When an ample amount of fuel is stored in the separate compartment 16, then the valve head 18a is kept seated on the valve seat 18b due to the buoyancy of the float 15a, not allowing the liquid fuel "F" in the fuel tank 10 into the separate compartment 16. If, however, a certain amount of the fuel in the separate compartment 16 has been assumed and the level of the fuel surface lowered to a certain extent, then the float 15a lowers accordingly whereby the valve head 18a becomes unseated from the valve seat 18b. The fuel "F" in the fuel tank 10 is now permitted to flow into the separate compartment 16 through the passage 17 until the amount of the fuel in the compartment 16 is increased and the valve head 18a seated again.

In order to maintain the pressure in the fuel tank 10 at a level within a certain range, two differently oriented one-way check valves 19 and 19' may be provided on the fuel tank 10. The valve 19 is constituted as an outlet check valve which blocks the flow of pressure in the fuel tank 10 but which permits atmospheric air into the tank when the pressure therein has decreased to a predetermined level. The valve 19', on the other hand, is an inlet check valve which blocks the flow of atmospheric air into the tank but which releases the pressure in the tank to the open air when the pressure has increased to a predetermined level. The pressure in the fuel tank 10 is thus maintained at a level within a predetermined level which can be adjusted by varying the performance characteristics of the two valves. In the event the pressure in the tank has increased to an unusual extent due, for example, to a temperature rise, then the inlet check valve 19' opens to release the thus increased pressure to the outside, protecting the fuel tank 10 from being damaged accidentally.

It will now be appreciated from the forgoing description that the liquid fuel stored in the fuel tank according to the invention is substantially isolated from the atmosphere so that only a limited amount of evaporative hydrocarbons are admitted to the open air. The fuel tank thus constructed will be advantageous in reducing the amount of air-pollutants to be discharged to the atmosphere.

What is claimed is:

1. A fuel tank for an automotive internal combustion engine comprising a partition extending from the top wall of the tank to define a partially separate compartment communicating at its bottom with the remaining compartment and with a fuel line; a breathing vent being formed in the top wall of said partially separate compartment; and a float for floating in a liquid fuel in said partially separate compartment, said float having a surface area substantially co-extensive with said surface of the liquid fuel in said partially separate compartment.

2. A fuel tank according to claim 1, including a valve means between said partially separate compartment and remaining compartment, said valve means comprising a valve head depending from the bottom of said float and a valve seat cooperating with said valve head, said valve head being seated on said valve seat when an ample amount of liquid fuel is stored in said partially separate compartment and unseated when the level of the surface of the liquid fuel in said partially separate compartment lowers to a predetermined level.

3. A fuel tank according to claim 2, wherein outlet and inlet check valves are provided on the wall of said remaining compartment, said outlet check valve opening when the pressure in said remaining compartment decreases to a predetermined level and said inlet check valve opening when the pressure in said remaining compartment increases to a predetermined level.

4. A fuel tank according to claim 1, wherein said float is of a material having a specific weight smaller than the liquid fuel.

* * * * *